April 14, 1964

R. KOBLER 3,128,563

DECODE-ENCODE SYSTEM FOR TEACHING MACHINES

Filed April 6, 1962

INVENTOR.
RICHARD KOBLER

BY George H. Fritzinger

AGENT

April 14, 1964 R. KOBLER 3,128,563
DECODE-ENCODE SYSTEM FOR TEACHING MACHINES
Filed April 6, 1962 4 Sheets-Sheet 2

INVENTOR.
RICHARD KOBLER
BY George H. Fritzinger
AGENT

April 14, 1964     R. KOBLER     3,128,563
DECODE-ENCODE SYSTEM FOR TEACHING MACHINES
Filed April 6, 1962     4 Sheets-Sheet 3

FIG. 2A

KEY RELEASED
MS 0   10 20    50       100       150

| K105 DROPPED | K114 OPENED | TRANSLATOR | CLUTCH PULSE | K114 CLOSED |
| C24 OPERATED | K115 DROPPED | DECODED | K80 OPERATED | TRANSLATOR |
| E40 OPERATED | K119 DROPPED | | (ENCODE) | ENCODED |
| K80 OPERATED | L LINE OPENED | | K MACHINE | K105 OPERATED |
| (DECODE) | C24 DROPPED | | STARTED | K115 OPERATED |
| | E40 DROPPED | | K56 OPERATED | |
| | | | C19 STOPPED | |

FIG. 2B

KEY RELEASED
MS 0            50       100       150

| K105 DROPPED | K114 OPENED | CLUTCH PULSE | K114 CLOSED |
| C24 OPERATED | K115 DROPPED | K129 OPERATED | K115 OPERATED |
| E40 OPERATED | K119 DROPPED | K119 OPERATED | K129 DROPPED |
| K80 OPERATED | C24 DROPPED | K80 OPERATED | K119 HELD |
| (DECODE) | E40 DROPPED | (ENCODE) | K105 STAYS |
| | | NO K MACHINE | DROPPED |
| | | OPERATION | |

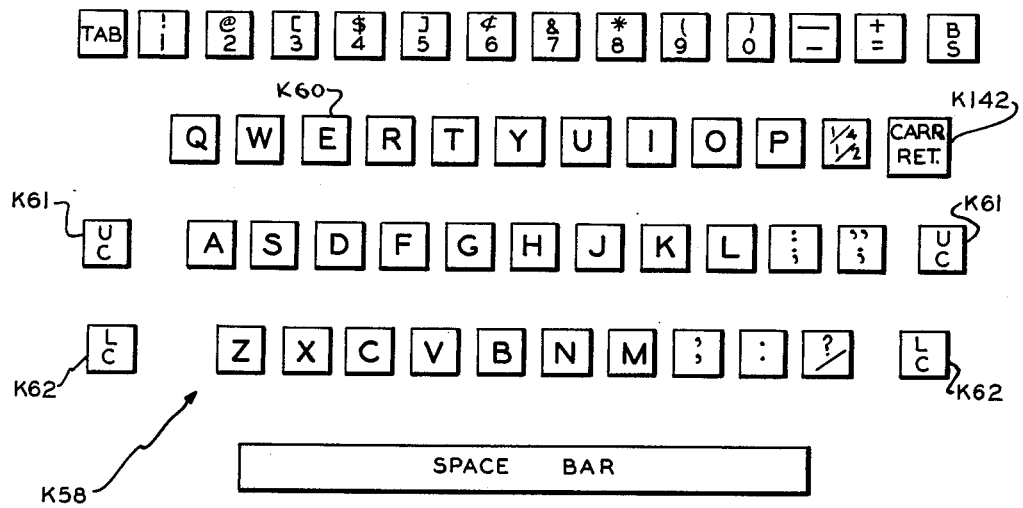

FIG. 3

INVENTOR.
RICHARD KOBLER
BY George H. Fritzinger
AGENT

April 14, 1964 R. KOBLER 3,128,563
DECODE-ENCODE SYSTEM FOR TEACHING MACHINES
Filed April 6, 1962 4 Sheets-Sheet 4
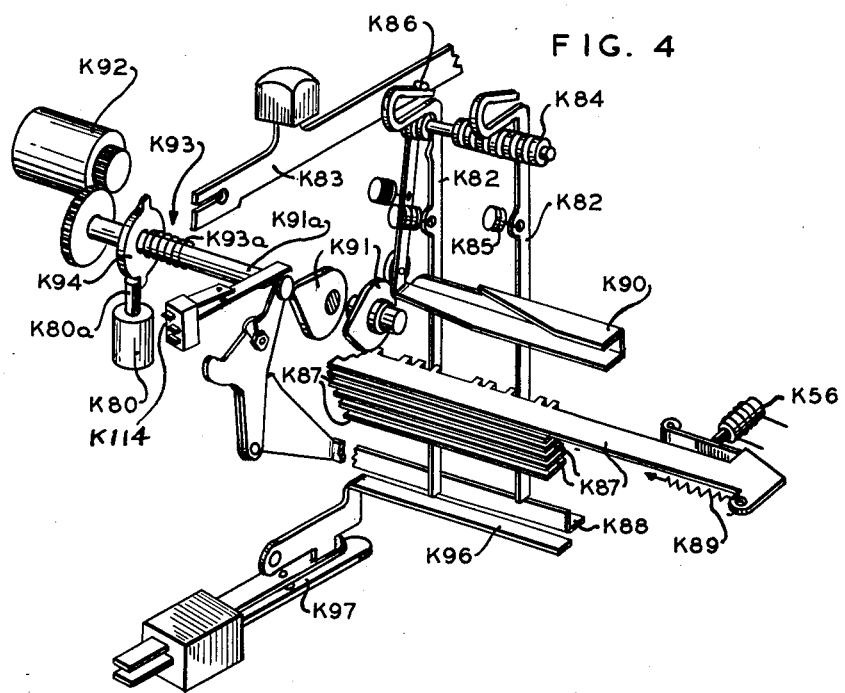
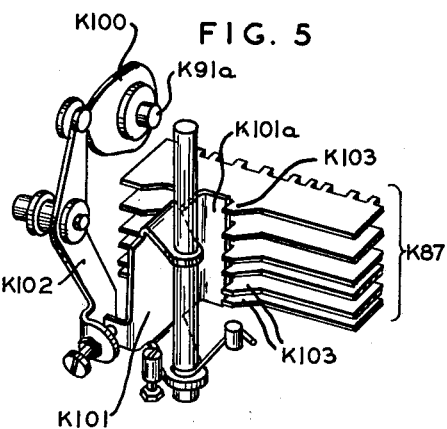
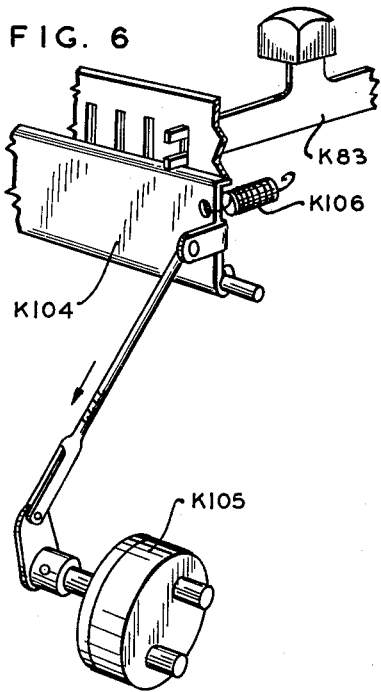
INVENTOR.
RICHARD KOBLER
BY
George H. Fritzinger
Agent

United States Patent Office 3,128,563
Patented Apr. 14, 1964

3,128,563
DECODE-ENCODE SYSTEM FOR TEACHING
MACHINES
Richard Kobler, West Orange, N.J., assignor to McGraw-Edison Company, Elgin, Ill., a corporation of Delaware
Filed Apr. 6, 1962, Ser. No. 185,555
8 Claims. (Cl. 35—6)

This invention relates to improvements in teaching machines of the character described in the application Serial No. 185,616 of Kobler et al. filed on even date herewith and entitled Educational System and Apparatus. More particularly the invention relates to an improved and simplified decode-encode system for such teaching machines.

In the teaching machine described in the aforesaid Kobler et al. application, the pointer of a card exhibiting machine is advanced by steps along a printed card to point out successive characters on the keyboard of a typewriter, and during each advance of the pointer an encoder is operated to activate selectively a keyboard audio machine to pronounce the character indicated by the pointer and to encode (free) the respective key of the typewriter. When the pupil finds the encoded key and depresses the same, the machine repronounces the character, decodes itself and restarts both the card exhibiting machine and the encoder to repeat the cycle as to a next character to be exhibited. When words and sentences have been so pointed out and typed the machine pronounces and explains the same. This automated teaching methodology has proven to be very effective in teaching children to learn the characters on the keyboard of a typewriter and to type the same, and then to learn to read, spell, type and write words and sentences at a very early age.

The encoding system for such teaching machines is of the binary type typically of six units to permit the encoding of as many as sixty-four characters. Each code signal comprises a prerecorded series of six blank or recorded spaces, referred to respectively as non-recorded and recorded bits, which are in a prearranged combination according to the binary code for the respective character. Thus, the code signal for the numeral "4" may consist of recorded bits in intervals 1, 3 and 6 and blank bits in intervals 2, 4 and 5. Each bit may be 20 mils long on the record to require 120 mils length for the six bits. Following the last bit there is a 20 mil non-recorded "read out" bit followed by a 40 mil non-recorded "home zone." Each encoding requires therefore approximately 180 mils length on the record.

As a code signal is reproduced the signals picked up from the recorded bit intervals are directed by a timed commutator to respective bit relays to activate the same in combinations according to the positions of the recorded bit intervals. These relays in turn complete respective circuits—referred to as the "logic circuits"—according to the combinations thereof so activated to selectively activate the keyboard audio machine to pronounce the respective characters. Additionally, the encode bits relays control respective translator solenoids which shift respective permutation bars to free the key of the typewriter bearing the character being pronounced. When the pupil depresses the encoded key the machine repronounces the character and locks up again the entire keyboard. After each depression and release of an encoded key it is necessary to decode the logic—i.e., drop out the encode bit relays—and to decode the translator—i.e., to return the permutation bars—before a next encoding can be completed. The present invention resides in an improved decode-encode system which is activated by a single start pulse to progress through an entire decode-encode cycle responsive to each release of an encoded key of the typewriter. A further feature of the invention is in decoding the logic at the start of each cycle in decoding the translator as to the prior character during the encoding of the logic of each new character. As to details of the system not herein necessary to describe for purposes of the present invention reference may be had to the aforesaid Kobler et al. application.

In describing the present invention reference is had to the accompanying drawings, of which:

FIGURES 1A and 1B taken together constitute a schematic circuit diagram of a new system and apparatus for a teaching machine embodying the decode-encode system according to my invention;

FIGURE 2A is a time chart showing the timing of certain operations of the decode-encode cycle when a character is encoded;

FIGURE 2B is a similar time chart of a decode-encode cycle involving a filler code;

FIGURE 3 is a plan view of the keyboard of a typewriter used in the present system;

FIGURE 4 is a fractional perspective view of the typewriter keyboard translator mechanism showing the parts in the positions which they occupy at the end of a decode-encode cycle;

FIGURE 5 is a rear view of a decode mechanism for camming the permutation bars into latched unoperated positions, showing the cam in a mid-position of its one-half revolution of decode movement; and FIGURE 6 is a perspective view showing a keyboard lock mechanism.

Figure 1A:
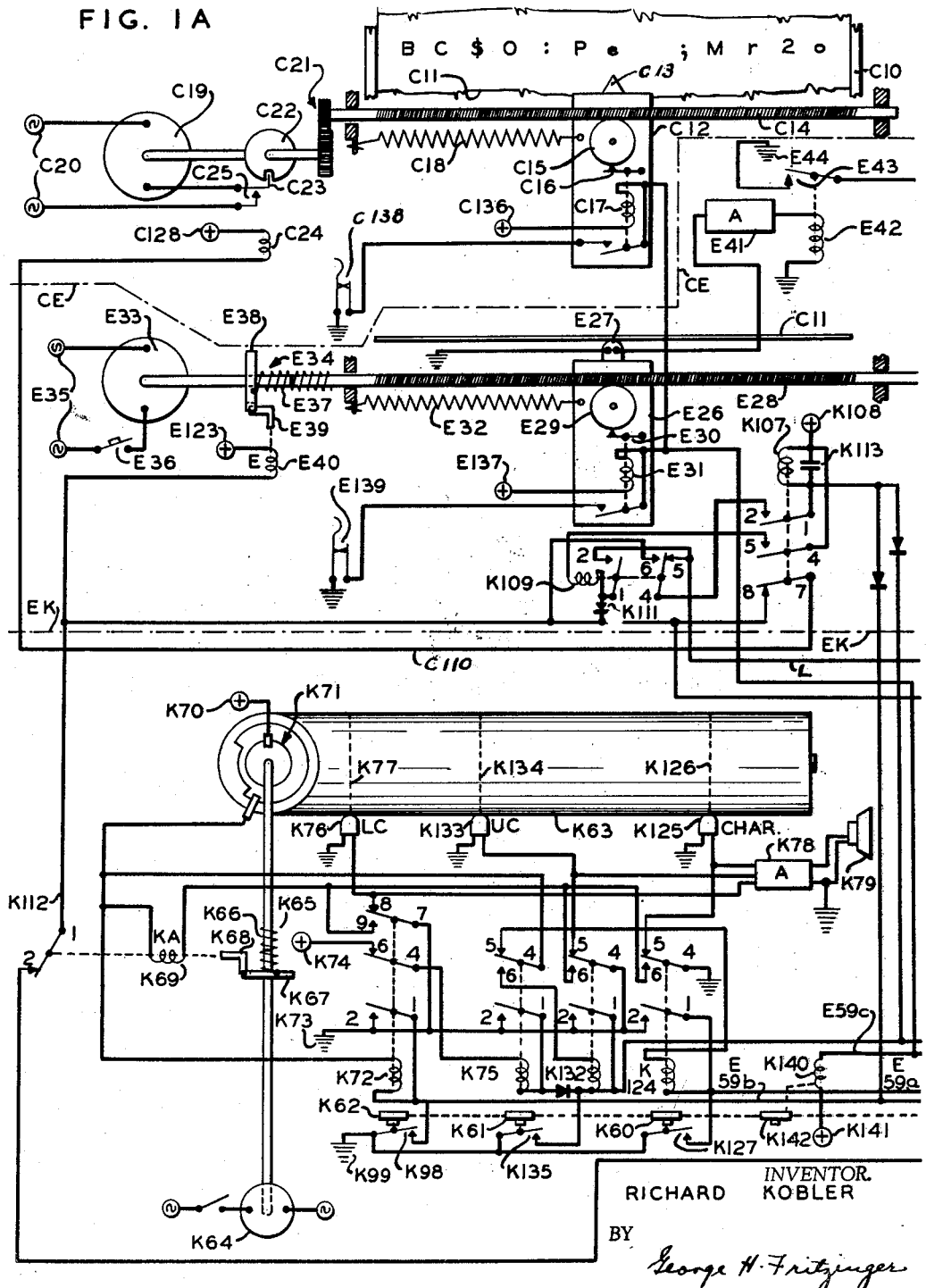
Figure 1B:
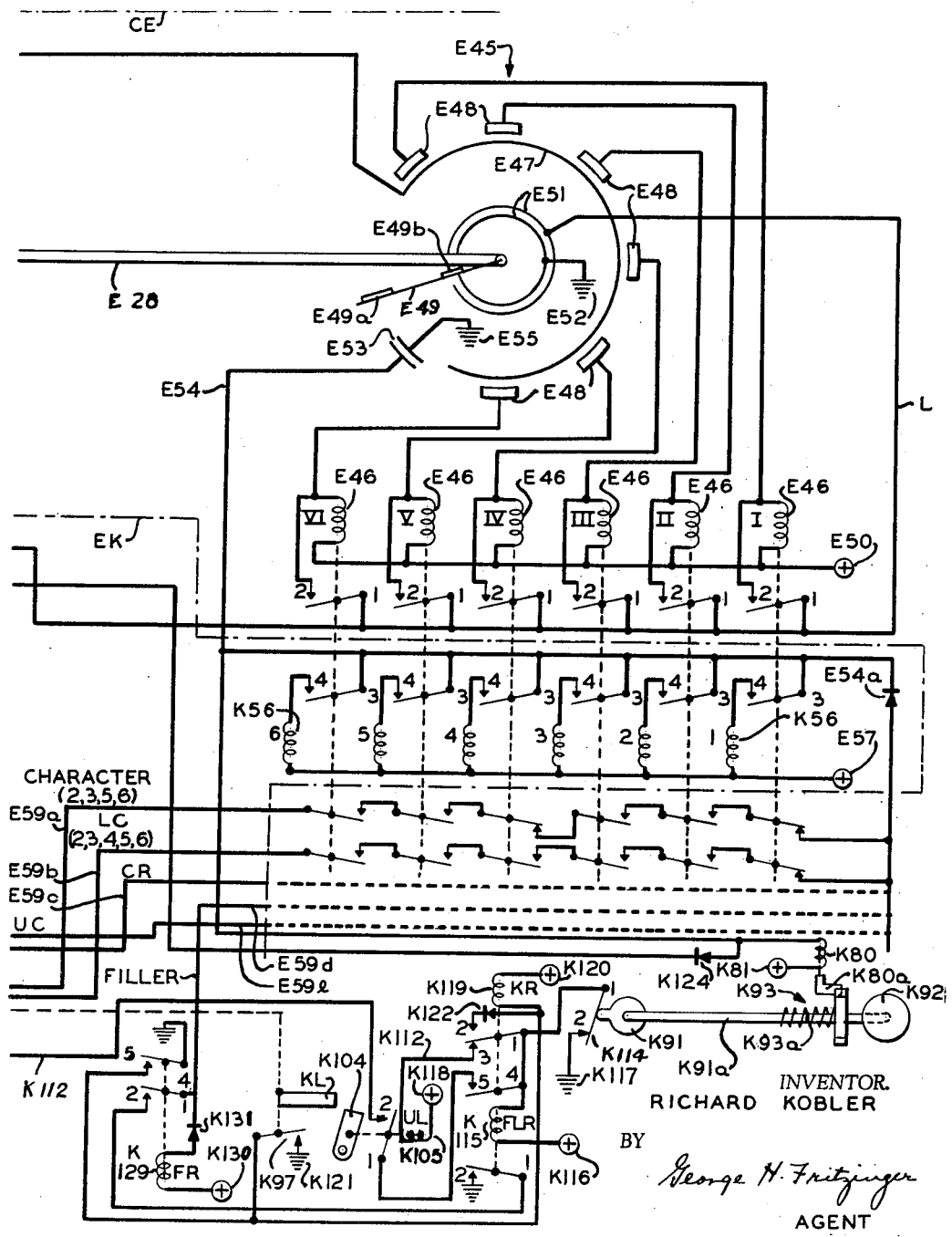

In the schematic drawing of FIGURES 1A and 1B there are dash-dot division lines CE and EK respectively dividing the apparatus of a card exhibiting machine C from that of an encoder E and the apparatus of the encoder E from that of a keyboard audio machine K. In describing the elements of the different portions of the present system, the prefix letters C, E and K followed by reference numerals are used with reference to the card machine C, the encoder E and the keyboard audio machine K respectively. In referring to the electric switches of these different portions of the apparatus there is used a prefix letter of the portion to which the switch applies together with a reference number followed by a dash and the numbers of the switch contacts separated by a comma.

The card exhibiting machine C comprises a holder C10 for a card C11 having printed characters on its front side along successive lines. The printed characters may be of random order, as shown, or may form words and sentences depending on whether the pupil is in an early or later stage of learning. Movable transversely across the front side of the card C11 is a carriage C12 having thereon a pointer C13 of suitable character. The carriage is advanced from left to right by a feed screw C14 engaging a circular feed nut C15 journaled on the carriage, the feed nut being normally held from turning by a pawl C16. When it is desired to return the carriage the pawl is disengaged by a return solenoid C17 to allow the carriage to be snapped back to a home position by a return spring C18. The feed screw C14 is driven by a motor C19 operated from a power source C20. The feed screw is coupled through step-up gearing C21 to the motor shaft so that one revolution of the motor will turn the feed screw several revolutions to advance the pointer C13 from one character ot the next through a distance typically of about three-eighths inch. Upon each activaiton thereof the motor is caused to run through one revolution under control of a notched disk C22 engaged by a pawl C23 of a pointer advance solenoid C24. When the solenoid is energized it withdraws the pawl from the peripheral notch of the disk and closes a switch C25 in the motor circuit to start the same. The control system is such, as will appear, to deactivate the start solenoid C24 while the motor is undergoing a first revolution of rotation, but upon such deactivation of the solenoid C24 the pawl C23 is released against the periphery of the disk C22 without opening the switch C25 until the pawl comes into registration with the peripheral notch of the disk. Each such single revolution of rotation of the motor C19 is adapted to advance the pointer carriage through the interval from one character to the next on the printed card.

The encoder E comprises a carriage E26 having a magnetic head E27 thereon engaging the back side of the card C11. The back side of the card has a magnetic coating bearing a prerecorded encode track for each printed line on the front side of the card. Advance movement of the encode carriage E26 is produced by a feed screw E28 engaging a circular feed nut E29 journaled on the carriage, the feed nut being normally locked against turning by a pawl E30. When it is desired to return the encode carriage the pawl is disengaged by a return solenoid E31 to allow the carriage to be snapped back to home position by a return spring E32. The feed screw is driven by a motor E33 through a one-revolution clutch E34. The motor is started by an on-off control switch E36 in series therewith and is left to run continuously while the machine is in a standby condition. The clutch comprises a helical spring E37 enveloping an end portion of the motor shaft and an adjacent end portion of the feed screw. One end of this spring is secured to a dog E38 journaled on the motor shaft. The dog has a single peripheral catch engaged by a pawl E39 to hold it in a single position of rotation. While the dog is latched the frictional engagement of the motor shaft on the helical spring tends to unwind the same and allow the shaft to slip relative thereto. However, when the dog is released the spring is allowed to turn with the motor shaft and is gripped thereon by the resisting load of the feed screw. As will appear, the pawl E39 is disengaged momentarily by a start solenoid E40 each time it is decided to start a decode-encode cycle and is disengaged before one revolution of the motor shaft takes place to limit each encode operation to a single revolution of the drive motor. During such single revolution of the motor the encode head E27 is advanced through approximately 180 mils—which is approximately half the distance of spacing from one character to the next on the printed card C11.

The encode track on the back of the card C11 has prerecorded code signals thereon for the respective characters and control operations represented by the keys of the keyboard of the typewriter. Typically, the encode head is moved through each 180 mil interval for a code signal in approximately 150 milliseconds. In the first 100 mils of each 180 mil interval there are the recorded and non-recorded bits according to the binary code for the respective character represented by the code signal. The recorded bits are fed through an amplifier E41 to an encode relay E42. This relay controls a switch E43 connected in a circuit leading from ground E44 through a commutator E45 to six encode bit relays E46 designated I to VI. The commutator comprises a slip ring E47 having an arcuate length of approximately 270° and six commutator segments E48 spaced equally through an interval of approximately 240°. The successive commutator segments proceeding in a clockwise direction are connected respectively to the encode bit relays I to VI. A commutator arm E49 is connected to the feed screw E28 to turn one revolution during each encode operation. This arm has an outer brush E49a which bridges electrically the ring E47 with the segments E48 in succession while the encode head is scanning the respective bits of the code signal. As the head scans a recorded bit, say in the first interval the relay E42 will be activated by that signal to close the switch E43 at the time the commutator arm E49 is registering with the first commutator segment; as a result a circuit connection is completed from plus terminal E50 through the first encode bit relay E46, the first of the commutator segments E48, switch E43 and ground E44 to activate the first encode bit relay. Once an encode bit relay is so activated it is held by a lockline L running through contacts 1, 2 of the relay and through a pair of slip rings E51 bridged by a brush E49b of the commutator arm E49 to ground E52. As the encode head scans a non-recorded bit the encode relay E42 is not activated with the result that no circuit is completed to activate the respective encode bit relay E46. Thus, when the encode head has scanned the six bit intervals of a code signal, one or more of the bit relays will stand operated according to which of the bit intervals of the code signal were recorded. As the encode head scans the non-recorded read-out interval of the code signal following the last of the six bit intervals the brush E49a registers with the clutch segments E53 to complete a read out line E54 to ground E55. The read out line completes a ground connection for (1) a "logic" circuit determined by the particular combination of encode bit relays then standing activated and for (2) one or more of six translator solenoids K56, numbered 1 to 6, according to the combination of the encode bit relays then operated. For example, each encode bit relay has a set of contacts 3, 4 which is closed when the relay is operated to connect the respective translator solenoid K56 to the read out line E54. When the commutator arm passes the clutch segments E53 the translator solenoids corresponding to the activated encode bit relays are operated as a group from the plus terminal E57.

The encode bit relays E46 have also as many switches as there are characters and control functions to be encoded. A standard typewriter keyboard K58 such as is shown in FIGURE 3 can be controlled by a six unit binary code through a series of encode lines E59. Corresponding switches of the encode bit relays are connected in series in the respective encode circuits to provide parallel lines E59a, E59b, E59c, etc., connected in common through a diode E54a to the read out line E54. In each such encode line the switches of the bit relays stand normally open corresponding to the recorded bit intervals of the code signal for the character to be controlled and the switches of the remaining bit relays stand normally closed. For example, assuming that encode line E59a represents a character having recorded bits in intervals 2, 3, 5 and 6, the switches of the bit relays E46, marked II, III, V and VI are open and those for the bit relays marked I and IV are normally closed. Thus, when the encode bit relays marked II, III, V and VI are operated the encode line E59a will have a through connection to ground E55 the instant the commutator arm E49 registers with the clutch segments E53.

An encode line E59 runs to the keyboard audio machine K for each selective control operation to be there performed. This keyboard audio machine is of the type described in the pending Moore et al. application Serial No. 113,420, filed May 29, 1961, and entitled Educational Apparatus for Children. This machine comprises an electric typewriter having the keyboard E58 but in the circuit diagram of FIGURE 1 only three character keys K60, K61, and K62, and a carriage return key K142, are indicated for purposes of illustrating the invention. The keys are mounted on respective key levers. Associated with the key levers is the usual ball raceway (not shown) which permits the depression of only one key at a time. As each key is depressed it trips a cam mechanism into driving engagement with a power roll (not shown) to drive the respective key bar into engagement with the platen. This apparatus is standard and need not be herein shown.

The audio portion of the keyboard audio machine comprises a magnetic drum K63 having successive circumferential tracks prerecorded with the pronunciation of the characters and control functions represented by the keys of the typewriter. This drum is driven by a motor K64 through a one-revolution clutch K65 comprising a helical spring K66 spanning a break in the shaft running from the motor to the drum. One end of this helical clutch spring is secured to a dog K67 journaled on the shaft extending from the motor. When the dog is held from turning by a pawl K68 of a solenoid K69 the frictional force of the motor shaft on the clutch spring tends to unwind the same slightly and permit free turning of the shaft. However, the instant the dog is released by activation of the solenoid K69 the natural resilience of the spring and the load force of the drum tightens the spring onto the motor shaft to couple the drum to the motor. The solenoid K69 is energized from a plus terminal K70 through a drum switch K71 which is held closed except when the drum is driven through its "home-end zone" just prior to the completion of each revolution. As will appear, the one revolution clutch solenoid K69 is energized through the drum switch and is dropped as the drum enters this home end zone to limit each rotation of the drum to a single revolution.

By way of example, let it be assumed that the machine has been in an upper case condition and that the pointer C13 has advanced through a succession of upper case characters to the lower case letter "e" as shown in FIGURE 1A. It will thus be necessary for the pupil first to press the lower case shift key K62 before he can type the lower case letter "e." The machine apprises the pupil of this necessity by encoding "lower case" and pronouncing the same before the lower case letter "e" is itself encoded and pronounced. Since the machine encodes "lower case" as the pointer is advanced to the lower case letter "e" it is necessary to arrest the pointer in the encoding of lower case so that the pointer will remain at standstill when the letter "e" itself is next encoded. These operations will be apparent from the following detailed description.

In the encoding of "lower case" which occurs as the pointer is advanced from the upper case letter "P" to the lower case letter "e" the encode line E59b is completed to ground E55 the instant the commutator arm E49 passes the clutch segment E53. The encode line E59b is connected to one terminal of a lower case relay K72 having its other terminal connected through the drum switch K71 to the plus terminal K70 to cause this relay to be operated the instant the encode line is completed to ground E55. The instant the relay is so operated it obtains a hold circuit through its contacts 1, 2 to ground K73; also the relay K72 opens its contacts 4, 6 to disconnect a plus terminal K74 from an upper case lock relay K75 and thus prevent accidental operation of the relay K75 while the machine is in a lower case condition, and the relay K72 shifts its contact 7 from contact 8 to contact 9 to remove a mute circuit from a magnetic head K76 and to complete a connection of the drum start solenoid K69 from plus terminal K70 to ground K73 for starting rotation of the drum K63. The magnetic head K76 registers with a track K77 bearing a prerecorded pronunciation of "lower case." During the drum movement this signal is fed through amplifier K76 and to loud speaker K79 to cause the machine to pronounce "lower case." When the drum enters its home end zone the opening of the drum switch K71 drops the solenoid K69 and the lower case relay K72. Although the drum switch K71 is reclosed when the drum completes one full revolution of movement the dropping of the lower case relay as the drum entered its home end zone opened the relay contacts 7, 9 to prevent a reactivation of the drum clutch when the drum switch is reclosed. Further, the dropping of the lower case relay K72 again mutes the lower case head K76 and makes power available to the upper case lock relay K75 without however taking the machine out of a lower case condition since this condition is maintained mechanically until the upper case shift key K61 is pressed.

At the time the logic circuitry was completed via the clutch segments E53 to start the keyboard audio machine to pronounce "lower case" the translator solenoids K56, numbered 2 to 6 were also activated from plus terminal E57 to ground E55, and a one-half revolution clutch solenoid K80 was activated from plus terminal K81 to ground E55 to carry out the encoding of the translator. The translator mechanism shown in FIGURES 4, 5 and 6 comprises a seeker bar K82 for each key lever K83, which is guided near the top in a grooved rail G84 and which is urged forwardly and upwardly by a tension spring K85 connected to a central portion thereof. Each seeker bar has a looped upper end portion disposed below a side pin K86 on the respective key lever to form a coupling of the seeker bar with the key lever. Responsive to the spring K85 the lower portion of each seeker bar is urged against a set of six transverse permutation bars K87 having the rear edges thereof differently notched in such manner that when a combination of the permutation bars are shifted leftwardly as they appear in FIGURE 4 according to the recorded bit intervals of the code signal for the character being encoded the seeker bar engaging the key lever for the encoded character will have an aligned vertical path through the notches allowing it to be shifted forwardly by the spring K85. By this forward shifting of the seeker bar the lower end thereof is moved free of a blocking bail K88 to allow only that key lever to be depressed.

In the operation of the translator mechanism, the permutation bars are released respectively by the translator solenoids K56 as the solenoids are activated by the code signalling, and the instant a permutation bar is so released it is propelled leftwardly as it appears in FIGURE 4 to its operated position by a respective spring K89. During release of the permutation bars the seeker bars are held displaced therefrom by a translator bail K90 under influence of a one lobe cam K91. This cam is coupled to a drive motor K92 through a one-half revolution clutch K93 controlled by the clutch solenoid K80 aforementioned. This one-half revolution clutch comprises a helical spring K93a spanning a break between the motor shaft and a cam shaft K91a. Journaled on the motor shaft is a dog K94 connected to the adjacent end of the clutch spring K93a. This dog is controlled by a pawl K80a of the solenoid K80. However, in this case the dog has two diametrically opposite catches to permit it to be stopped after each half revolution of movement so that the cam K91 may be driven intermittently through successive one-half revolutions.

At the start of an encode operation the cam K91 stands in a position displaced one-half revolution from the position which it occupies in FIGURE 4 and thus holds the translator bail K90 rearwardly to hold the seeker bars out of contact with the permutation bars. At the same time the cam K91 holds the blocking bail K88 in a lowered position free of all of the seeker bars. This is done only so that when the typewriter is to be used in normal manner each of the keys may be in a released condition. When the translator solenoids K56 are activated they release instantly the respective permutation bars K87. Although the clutch solenoid K80 is activated at the same time there is a delay of about 25 milliseconds before the seeker bars are released against the permutation bars because a 50 millisecond time is required for the motor K92 to drive the cam shaft K91a through one-half revolution. During this one-half revolution of encode movement the cam K91 raises the blocking bail K88 to its operative position. Thus the translator mechanism is brought into a condition to block all keys of the typewriter except the key corresponding to the seeker bar which is freed by the permutation bars. In front of the blocking bail K88 is a bail K96 operable by the encoded seeker bar as the respective key lever is depressed to close a bail switch K97 the purpose of which is to prepare the machine for a decode-encode cycle as will appear.

When the pupil presses the encoded lower case shift key K62 a key switch K98 (FIGURE 1A) is closed momentarily by the power roll of the typewriter in the same manner as the type bar is driven against the platen; this closing of the switch K98 completes a circuit connection to ground K99 for the lower case relay K72 the same as was previously formed by the encode line E59b. The relay K72 is therefore operated again to start the machine and cause it to repronounce "lower case."

The logic circuitry is decoded by dropping the encode bit relays E46 and the translator mechanism is decoded by disengaging the encoded seeker bar from the permutation bars and then returning the operated permutation bars to their latched unoperated positions. In the present system the decoding of the logic is effected as an incident precedent to a subsequent encoding operation by causing the commutator arm E49 to break the lockline L in its first 5 milliseconds of movement from home position shown in FIGURE 1B. For this purpose one of the slip rings E51 has a break just in advance of the home position of the brush E49b. The decoding of the translator is accomplished by a second activation of the one-half revolution clutch solenoid K80 to drive the cam shaft K91a through a second one-half revolution of movement to a position displaced 180° from that shown in FIGURE 4. In the initial portion of this one-half revolution of decode movement the cam K91 on the shaft K91a shifts the translator bail rearwardly to disengage the encoded seeker bar from the permutation bars. At about the middle of this one-half revolution of decode movement a second cam K100 on the shaft K91a rotates a lever K101 through an intermediary coupling rocker K102 to shift all operated permutation bars back to their latched unoperated position. For this purpose, the lever K101 has a wide arm K101a spanning transversely the group of six permutation bars, and the permutation bars have a row of teeth K103 confronting the arm as indicated in FIGURE 5. During the last half of the one-half revolution of decode movement, the lever K101 is turned to recede the arm K101a from the teeth K103 so as to free the permutation bars to be shifted to their operate positions when in the next encoding operation they are again released by the translator solenoids. Also, during the decode movement of the shaft K91a the blocking bail K88 is lowered so as to free all the key levers from being blocked via the seeker bars. However, the instant the encoded key is released the entire keyboard becomes blocked by the blocking bail K104 (FIGURES 1B and 6) hereinbefore described. This blocking bail is held in a released position by a solenoid K105 when the machine has completed a decode-encode cycle to permit then the encoded key to be depressed as will appear.

As before mentioned, the encode head E27 is moved through one-half the distance between successive characters on the printed side of the card C11 during each encode operation so as to permit two encodings in the distance of spacing between two letters. Two such encodings are required for example when the pointer is shifted from an upper case to a lower case character, or vice versa, since there is then required an encoding of lower case or upper case followed by an encoding of the character itself. In order that the pointer will remain at standstill during the encoding of the character itself the prior encoding of lower case or upper case, as the case may be, is adapted to operate a pointer hold relay K107 (FIGURE 1A) and the subsequent encoding of the character itself is adapted to release the pointer hold relay. For example, the pointer hold relay K107 is connected from plus terminal K108 to the encode circuit E59b for "lower case" to operate this hold relay the instant the encode circuit is connected to ground E55. This hold relay has (1) a set of normally open contacts 1, 2 which are closed to complete a hold circuit to the lockline L via contacts 4, 5 of a release relay K109 when the hold relay is operated, (2) has a pair of contacts 4, 5 to prepare an operate circuit for the release relay K109, and (3) has a pair of normally closed contacts 7, 8 for opening the start circuit C110 for the card machine C. Thus, the instant the commutator arm E49 passes the clutch segment E53 at the end of an encode operation for "lower case" the pointer hold relay K107 is operated and held via the lockline to retain the start circuit for the card machine in an open condition. The card machine will therefore not be operated in the next encode operation but the release relay K109 is then activated through a diode K11 and the encode start circuit K112. In the operation of the release relay the same obtains a hold circuit through its contacts 1, 2 and the lockline L, and in this same operation the release relay shifts contact 4 from contact 5 to contact 6 to shift the hold circuit for the hold relay K107 from the lockline L to the start circuit K112. During this shift of the hold circuit for the hold relay K107 the latter is retained in operated position by reason of a condenser K113 connected in shunt therewith. The start circuit K112 is opened in about 10 milliseconds from the start of a decode-encode cycle by the opening of a code switch K114 later described to drop the hold relay K107 and return connection of the start solenoid C24 of the card machine to the start circuit K112 so that a pointer advance will take place during the next encode operation. By the opening of the lockline L at the beginning of the decode-encode cycle the pointer release relay K109 is dropped to prepare the hold circuit for the hold relay K107 again via the lockline L.

By the present invention there is provided a new decode-encode control system which causes a complete decode-encode cycle to be started when the pupil releases an encoded key. During this cycle the logic circuitry is first decoded and then the logic circuitry of the new character is encoded with the decoding of the translator taking place during the first 50 milliseconds of the 90 millisecond interval required for encoding the logic of the new character. For example, assuming the machine is in an encoded condition with the keyboard audio machine having been last activated to pronounce "lower case" and the translator mechanism having been last activated to encode the lower case shift key K62, the pointer hold relay K107 will stand operated as before-described and only the lower case shift key K62 is free to be depressed. Further, the one-half revolution clutch K93 will be disengaged, the cam K91 will be in position to hold closed a code switch K114—a position of "decode preparation"—and the collector arm E49 will stand in home position just past the clutch segments E53 all as is shown in FIGURE 1A. Still further, a filler lock relay K115 will stand activated from plus terminal K116 through code switch K114 to ground K117, and will hold its contacts 1, 2 open without any immediate effect. The keyboard lock relay K105 will stand activated from plus terminal K118 through contacts 1, 3 of a key relay K119 and the code switch K114 to ground K117 to hold the locking bail K104 free of the key levers generally indicated in FIGURE 1A at KL. The lock relay K105 now also holds open its contacts 1, 2 in the encode start circuit K112 to prevent any encode operation from being now started.

When the pupil finds and depresses the encoded key, the lower case shift key K62, the bail switch K97 is closed to activate the key relay K119 from plus terminal K120 through bail switch K97 to ground K121. Activation of the key relay K119 closes contacts 1, 2 to provide a hold circuit from plus terminal K120 through diode K122 and code switch K114 to ground K117, breaks its contacts 1, 3 to disconnect the keyboard lock relay K105 and closes its contacts 4, 5 in the encode start circuit K112 to prepare this circuit for a subsequent encode operation. However, no encode operation is started yet because the deactivation of the keyboard lock relay K105 merely drops the locking bail K104 against the end of the depressed key lever without allowing the switch K105–1, 2 to close and complete the encode start circuit K112. The depressing of the encoded key therefore prepares the encode start circuit without yet starting the decode-encode cycle. However, the reactivation of the lower case relay K72 responsive to depressing the lower case shift key starts the keyboard audio machine to repronounce "lower case" as before-described. This reactivation of the keyboard audio machine causes the keyboard audio start solenoid K69 to open its contacts 1, 2 in the encode start circuit K112 and prevent a decode-encode cycle from starting until the keyboard audio start solenoid K69 is dropped by the drum K63 having moved into its home end zone to open the drum switch K71.

When the pupil releases the encoded lower case shift key K62, the locking bail K104 is snapped by spring K106 thereunder to lock the entire keyboard and to close the switch K105–1, 2 in the encode start circuit K112. If the pupil releases the key before "lower case" is reproduced the switch K69–1, 2 will delay the activation of the encode start circuit. However, when both the switch K69–1, 2 and the switch K105–1, 2 are closed the encode start circuit is completed via the key relay switch K119–5, 4 and the code switch K114 to ground K117 to cause (1) activation of the encode start solenoid E40 from plus terminal E123, (2) activation of the one-half revolution clutch solenoid K80 from plus terminal K81 through diode K124, and (3) activation of the pointer release relay K109 from plus terminal K108 through switch K107–4, 5, diode K111 and encode start circuit K112. This operation of the pointer release relay K109 closes its contacts 1, 2 to provide it with a hold circuit through the lockline L and it shifts its contacts 4 from contact 5 to contact 6 to shift the hold circuit for the pointer hold relay K107 from the lockline L to the encode start circuit K112 so that the pointer hold relay will not be dropped by the momentary opening of the lockline L about to ensue. Note that since the pointer hold relay K107 is considered in the present example as having been operated by reason of the prior encoding of "lower case" the pointer start solenoid C24 is disconnected from the encode start circuit K112 with the result that the pointer C13 now remains at standstill.

The activation of the encode start solenoid E40 begins driving the encode head E27 through an interval to pick up the code signal for the letter "e" having recorded bits, say at intervals 2, 3, 5 and 6, and at the same time it turns the commutator arm E49 through one full revolution. In the first 5 to 10 milliseconds of movement of the commutator arm E49 from home position the brush E49b opens the lockline L momentarily to drop the encode bit relays E46, marked II to VI for "lower case" to decode the logic; however, the momentary opening of the lockline L does not drop the pointer release relay K109 since the same is maintained operated during the momentary opening of the lockline via the diode K111 and encode start circuit K112. After about 5 to 10 milliseconds the lockline is reclosed and the pointer release relay K109 continues to be energized via the lockline L until the pointer hold relay K107 is itself dropped by the opening of the encode start line K112. This opening of the encode start line occurs in 10 to 20 milliseconds by the cam K91 opening the code switch K114. The opening of the code switch has the following results: (1) it drops the pointer hold relay K107 causing the same to open its hold contacts 1, 2 and prevent further operation until the pointer hold relay is again activated from an encode circuit of the logic circuitry; (2) it drops the one-half revolution clutch solenoid K80 to limit driving the code cam K91 to one-half revolution of decode movement which decodes the translator mechanism by first disengaging the encoded seeker bar from the permutation bars and then returning the permutation bars to their latched unoperated positions; (3) it drops the key relay K119 to place the encode start line K112 in an unprepared condition by the opening of the contacts K119–4, 5; and (4) it drops the encode start solenoid E40 to limit the encode movement to one revolution of the feed screw E28. The dropping of the pointer hold relay K107 opens the hold circuit at contacts K107–4, 5 for the pointer release relay K109 to drop the latter. Although the dropping of the pointer release relay returns the hold circuit for the pointer hold relay K107 to the lockline L this occurs after the hold relay K107 is dropped and its hold circuit is opened at contacts K107–1, 2 with the result that the hold relay is not now reoperated.

Concurrently as the commutator arm E49 is moved past approximately the first three commutator segments E48 the drive motor K92 is turning the code shaft K91a through one-half revolution of decode movement to decode the translator. In the ensuing 50 milliseconds the commutator arm E49 is moved past the remaining three commutator segments E48 to complete the set up of the encode bit relays E46 according to the recorded code signal being reproduced and is then moved to the clutch segments E53 to produce the following results: (1) complete the logic circuitry via the encode line E59a to energize a character relay K124 via the upper case lock relay switch K75–5, 4 and the drum switch K71 to plus terminal K70, (2) activate the one-half revolution clutch solenoid K80 to start the code shaft K91 through one-half revolution of encode movement and (3) activate the translator solenoids K56, numbers 2, 3, 5 and 6 for the encoded letter "e" to unlatch the respective permutation bars for encoding the "e" key K60 of the typewriter. The energization of the character relay K124 closes its contacts 1, 2 to provide a hold circuit therefor, opens its contacts 4, 5 to remove a mute for the head K125 registering with a track K126 bearing a recorded pronunciation of the letter "e", and closes its contacts 4, 6 to activate the clutch solenoid K69 for the keyboard audio machine through one revolution of drum movement to pronounce the letter "e". In the first 50 millisecond movement of the drum K63 of the keyboard audio machine the one-half revolution encode movement of the code shaft K91a is completed to free the "e" key K60, and then the code switch K114 is closed to produce the following results: (1) operate the keyboard unlock solenoid K105 to free the encoded key to be depressed and to open the contacts 1, 2 without however immediate effect because the encode start circuit K112 is already held open at K119–5, 4, and (2) to reoperate the filler lock relay K115 also however without immediate effect. The decode-encode cycle stands now completed with the machine being in an encoded state awaiting the pupil to find and depress the "e" key K60.

When the pupil depresses the "e" key the character relay K124 is reactivated by the closing of the key lever switch K127 to cause the machine to repronounce the letter "e". Also, this depression of the "e" key closes the bail switch K97 to operate the key relay K119 and prepare the encode start circuit K112. When the pupil releases the "e" key, assuming the keyboard audio machine has already completed pronunciation of the letter "e" to cause the switch K69–1, 2 to be already closed, the machine starts a new decode-encode cycle in which the pointer advance solenoid C24 is activated from the plus terminal C128 to advance the pointer C13 to the next character, since the pointer hold relay K107 is now dropped, and in which the encode start solenoid E40 is activated to advance concurrently the encode head E27 to encode the machine for the next character.

The purpose of a filler code signal is to run the machine through a decode-encode cycle to advance the pointer C13 without activating the keyboard audio machine. Thus, assume that in response to the pupil releasing the "e" key K60, the ensuing advance of the encode head causes operation of a combination of the encode bit relays E46 to complete the filler encode line E59d. When the commutator arm E49 reaches the clutch segments E53 during the encoding it will activate the filler relay K129 from plus terminal K130 through diode K131 and will concurrently activate the one-half revolution clutch solenoid K80 to start driving the code shaft K91a through its one-half revolution of encode movement. These operations occur about 100 milliseconds from the start of the decode-encode cycle, which is at a point in the cycle when the code switch K114 is open and the filler lock relay K115 is not operated. Thus, the filler relay obtains immediately a hold circuit via its contacts 1, 2 and the contacts 1, 2 of the filler lock relay K115. The operation of the filler relay closes its contacts 4, 5 paralleling the bail switch K97 to operate the key relay K119 the same as though a key were depressed. The keyboard lock relay switch K105-1, 2 is already closed when the key relay K119 is operated to complete the encode start circuit K112 the instant the one-half revolution encode movement of shaft K91a is completed to start it running throuhg another decode-encode cycle the same as when an encoded key is released. The closing of the code switch K114 at the end of the first decode-encode cycle and at the start of the second cycle activates the filler lock relay K115 to drop the filler relay K129. In the ensuing decode-encode cycle the machine is decoded of the filler encoding, the pointer is advanced to the next character, and the machine is encoded to pronounce the next character and to release the key of the typewriter bearing that character. Thus, upon releasing the "e" key the machine is operated through two decode-encode cycles to cause the pointer C13 to be advanced through two intervals—i.e., through the space interval following the letter "e" and through the interval to the next character—with the machine then pronouncing the next character and awaiting the pupil to depress the respective encoded key.

Since an upper case letter "M" is shown in FIGURE 1A following the semicolon mark after the space interval, the encoding following the release of the key bearing the semicolon mark is that of "upper case" to enforce the pupil to press the upper case shift key K61 before pressing the key bearing the letter "M," the same as "lower case" is first encoded to enforce the pupil to press the lower case shift key K62, as before-described, when going from an upper case letter to a lower case letter. The encoding of "upper case" completes the encode line E59e to activate first the upper case lock relay K75 from plus terminal K74. Activation of this relay closes its contacts 4, 6 to activate the upper case relay K132 from plus terminal K170 through drum switch K71. Operation of the upper case relay K132 closes its contacts 1, 2 to provide a hold circuit to ground K73 and it shifts contact 4 from contact 5 to contact 6 to remove the mute from the magnetic head K133 registering with a track K134 bearing a recordation of "upper case" and to start a one-revolution movement of the drum K63. When "upper case" is so pronounced by the machine the drum enters its home end zone to open the drum contacts K71 and drop both the one-revolution clutch solenoid K69 and the upper case relay K132. However, when the pupil next presses the upper case shift key K61 the switch K135 is closed to reactivate the upper case relay K132 and start the drum turning to repronounce "upper case." Upon release of the upper case shift key K61, the new decode-encode cycle is started in the same way as before-described.

When the pointer has moved to the last character in a line on the record medium C11, say to the letter "o," and the pupil has pressed and released the key bearing that character, the pointer is advanced through a blank end space to encode the machine for "carriage return." This encoding closes the encode line E59c connected to the carriage return solenoid C17 for the card machine and the return solenoid E31 for the encoder so that the instant the carriage return line is completed to ground E55 by the commutator arm E49 passing the clutch segments E53, these return solenoids are activated respectively from the plus terminal C136 and the plus terminal E137. Activation of the solenoid C17 unlatches the respective feed nut C15 and activation of the return solenoid E31 releases the feed nut E29 to cause the carriages for the card machine and for the encoder to be snapped home by their respective return springs. The activation of the return solenoids completes hold circuits via respective home switches C138 and E139 to maintain the return solenoids operated until both carriages have been returned home. Upon the carriages for the card machine and encoder reaching home, these home switches are opened to drop the return solenoids and recouple the carriages to their respective feed screws. As an incident to returning the carriage C12 for the card machine the card C11 is advanced one line by any suitable means not however herein necessary to describe.

At the same instant that the "carriage return" encode line E59c is completed a carriage return solenoid K140 is operated from the plus terminal K141. The hold circuits provided the carriage return solenoid C17 and E31 for the card machine and encoder serve also as a hold circuit for the carriage return solenoid K140 for the typewriter until the carriages for the card machine and encoder are returned. By operation of the carriage return solenoid K140 a carriage return key K142 is depressed to return the carriage of the typewriter and to advance the line feed in the usual way as well as to operate the key relay K119 by the resultant closure of the bail switch K97. The hold down of the carriage return key K142 by the solenoid K140 is maintained until the carriages of the card machine and encoder are returned. When both the carriage for the card machine and the carriage for the encoder are returned and the carriage return solenoid K140 is dropped the resultant release of the carriage return key drops the keyboard lock bail K104 to close the switch K105-1, 2 and thereby start a new decode-encode cycle in the usual way. By this decode-encode cycle "carriage return" is decoded, and the first character in the next line on the printed card C11 is encoded with the pointer C13 being advanced to that character, the machine then pronouncing the character and the key for the respective character being freed and awaiting the pupil to depress the same. Thus, after an encoding of carriage return the machine is again in its usual standby condition wherein the pointer has been advanced to a new character, the machine has pronounced that character and the respective key is encoded.

It will be understood that any number of encode circuits E59 may be provided to a maximum of 64 for a six unit binary code to control as many different functions and/or devices. As described in the pending Kobler et al. application, supra, these functions and/or devices controlled by the encode circuits may for example include a word audio machine to make explanatory statements and/or give instructions as to letters, words and/or sentences exhibited to the pupil and a projector for providing a visual supplement to the audio pronunciations, statements and/or instructions. Since the decode-encode cycle would be the same for these additional functions and/or devices as for the illustrative examples already hereindescribed, no further description as to such additional functions and/or devices is herein necessary.

The embodiment of my invention herein particularly shown and described is intended to be illustrative and not necessarily limitative of my invention since the same is subject to changes and modifications without departure from the scope of my invention which I endeavor to express according to the following claims.

I claim:

1. In a teaching machine including a keyboard having characters imprinted on the keys thereof: the combination of an exhibitor having a medium with said characters imprinted thereon in preselected order and pointer means advanceable by steps to designate successive characters, a translator mechanism normally blocking said keyboard and activatable selectively to free said respective keys, a reproducer selectively activatable for pronouncing said respective characters, logic circuitry for selectively activating said reproducer, an encoder operated during a step advance of said pointer means to a new character for encoding said logic circuitry to cause said reproducer to pronounce said new character and for encoding said translator mechanism to free the respective key of said keyboard, means responsive to pressing said freed key for preparing said machine for a decode-encode cycle, and means responsive to releasing said freed key for starting said decode-encode cycle to (1) decode said logic circuitry and said translator mechanism in the sequence named, (2) advance said pointer means to a next succeeding character, and (3) operate said encoder to encode said logic circuitry to cause said reproducer to pronounce said next succeeding character and to encode said translator mechanism to free the key for said next succeeding character.

2. The combination set forth in claim 1, including means operated during a decode-encode cycle for decoding said translator mechanism as to a prior character simultaneously as said logic circuitry is encoded as to a next succeeding character.

3. The combination set forth in claim 1 wherein said logic circuitry includes a set of logic relays activated during an encode operation to prepare a selective encode circuit for starting said reproducer in a preselected condition to pronounce the character designated by said pointer means, wherein said translator mechanism includes a set of respective translator solenoids controlled by said logic relays and a set of translator permutation bars responsive to said translator solenoids for freeing the respective key of said keyboard, including means operated by said encoder during the initial portion of said decode-encode cycle for decoding said logic relays as to a prior character and then encoding said logic relays as to the next succeeding character, and means for decoding said translator mechanism during the decode-encode operation of said logic relays.

4. The teaching machine set forth in claim 1, wherein said translator mechanism includes a set of translator solenoids preset by the encoding of said logic circuitry, power drive means adapted for operation through successive one-half cycles of decode and encode movements, means operable by said power drive means in a one-half cycle encode movement thereof according to a presetting of said solenoids for freeing the key of said keyboard corresponding to the exhibited character, means operable by said drive means during a next succeeding one-half cycle of decode movement thereof for restoring all keys of said keyboard to a locked condition, and control means for starting said drive means through a one-half cycle decode movement during a first portion of the operation of the encoder to encode said logic circuitry and through a one-half cycle encode movement during a final portion of each decode-encode cycle following the encoding of said logic circuitry.

5. In a teaching machine including a keyboard having characters imprinted on the keys thereof: the combination of an exhibitor having a medium with characters imprinted thereon and pointer means movable by steps to indicate successive characters, a blocking means for said entire keyboard biased into a blocking position, a separate translator key blocking means selectively activatable to free the respective keys of said keyboard, a reproducer selectively activatable to pronounce said characters, an encoder operable during each advance of said pointer means to encode said translator to free the key corresponding to the character designated by said pointer means and to activate said reproducer to pronounce said character, means operable by said encoder at the end of each encode cycle to release said entire keyboard blocking means whereby to free the key released by said translator blocking means, means responsive to depressing said encoded key for preparing said encoder for operation through a decode-encode cycle causing in the sequence named said machine to be decoded as to the character represented by said encoded key, said pointer means to be advanced by one step, and said machine to be encoded as to the new character designated by said pointer means, and means responsive to release of said encoded key for restoring said entire keyboard blocking means and for thereupon operating the machine through said complete decode-encode cycle.

6. In a teaching machine including a keyboard having characters imprinted on the keys thereof: the combination of an exhibitor having a pointer means movable by steps to point out successive characters on a record medium, a reproducer selectively activatable for pronouncing said respective characters, logic circuitry for activating said reproducer, a lockline for holding said logic circuitry when activated, a translator mechanism normally blocking said keyboard and including translator solenoids selectively activated by said logic circuitry and drive means operable through an encode half cycle for releasing said respective keys and through a decode half cycle for re-locking said keys, an encoder including a prerecorded record having for each character a selected code signal followed by a read out interval and an encode head movable to reproduce a respective code signal during each step advance of said pointer means, means operable by the code signal picked up by said head for encoding said logic circuitry and translator solenoids, means responsive to release of an encoded key for starting a step advance of said pointer means and of said encode head and for concurrently starting said drive means through a one-half cycle of decode movement, said encoder including means to open said lockline momentarily to decode said logic circuitry before said head starts picking up said code signal and to cause said drive means to complete its one-half decode cycle before said encode head reaches said read out interval, and means activated by said encoder as said head scans said read out interval for starting said reproducer according to the selective activation of said logic circuitry and for starting said drive means through said one-half cycle encode movement for freeing a key of said keyboard according to the setting of said translator solenoids.

7. In a teaching machine having a normally blocked keyboard, means for pointing out successive characters on the keys of said keyboard, a reproducer for pronouncing the character designated by said pointer means and a translator mechanism for releasing the respective key of said keyboard; the combination of an encoder for said reproducer and translator including a record medium having an encode track with prerecorded code signals for said characters respectively each comprising a predetermined combination of recorded and nonrecorded bits followed by a read-out interval, an encode head, means for advancing said encode head by one signal interval as said pointer means is advanced to a new character, logic circuitry including encode bit relays operated in predetermined combination by said code signals for selectively activating said reproducer when the encode head reaches the read out interval of the code signal, a lockline for holding operated said encode bit relays, translator solenoids prepared for operation in predetermined combinations by said encode bit relays and operated by the encoder when said head reaches the read out interval of the code signal, drive means activated concurrently as said translator solenoids are activated to start an encode operation to free the key corresponding to the character indicated by said pointer means, said drive means being adapted when restarted to run through a decode movement to restore said translator mechanism to block said entire keyboard, and means responsive to releasing an encoded key to start a decode-encode cycle wherein said pointer means is advanced by one step and said encode head is concurrently advanced through a signal interval including means operable by the initial advance of said head to open momentarily said lock line to decode said logic circuitry and including timing means to cause said drive means to complete the decoding of said translator mechanism before said logic circuitry is encoded and to restart said drive means through an encode half cycle as said logic circuitry is encoded.

8. In a teaching machine having a normally blocked keyboard, means for pointing out successive characters on the keys of said keyboard, a reproducer for pronouncing the character designated by said pointer means and a translator mechanism for releasing the respective key of said keyboard: the combination of an encoder for said reproducer and translator including a record medium having an encoded track with prerecorded code signals for said characters respectively, an encode head, means for advancing said encode head by one signal interval as said pointer means is advanced to a new character, logic circuitry including encode bit relays operated in predetermined combination by said code signals for selectively activating said reproducer, a lockline for holding operated said encode bit relays, translator solenoids operated in predetermined combinations by said encode bit relays when said head reaches a read out interval of each recorded signal, drive means activated to start an encode operation to free the key corresponding to the character indicated by said pointer means, said drive means being adapted when restarted to run through a decode movement to restore said translator mechanism to block said entire keyboard, and means responsive to releasing an encoded key to start said encoder through a decode-encode cycle wherein said encode head is driven through a signal interval with the encoder decoding said logic circuitry immediately upon the head being started and with said drive means being driven through a decode movement to decode the translator during the encoding of the logic circuitry as to the next character, and means operable during the decode-encode cycle when the encoding of said logic circuitry is completed for sending a start pulse to start said drive means through an encode movement to free the key corresponding to the new character and to send the same pulse over the logic circuitry to start the reproducer to pronounce said new character.

References Cited in the file of this patent
UNITED STATES PATENTS

| | | |
|---|---|---|
| 2,012,001 | Fairchild | Aug. 20, 1935 |
| 2,255,030 | Tholstrup | Sept. 2, 1941 |
| 2,394,733 | Wittenmyer | Feb. 12, 1946 |
| 2,433,349 | Drewell | Dec. 30, 1947 |
| 2,848,090 | Sharpe et al. | Aug. 19, 1958 |
| 2,980,228 | Wlodarczak | Apr. 18, 1961 |
| 2,981,395 | Gibson | Apr. 25, 1961 |
| 3,021,611 | Goodell et al. | Feb. 20, 1962 |
| 3,063,537 | Allen | Nov. 13, 1962 |